United States Patent
Del Signore et al.

(10) Patent No.: US 10,432,555 B2
(45) Date of Patent: *Oct. 1, 2019

(54) METHOD AND APPARATUS FOR ROUTING BETWEEN FIBRE CHANNEL FABRICS

(71) Applicant: AVAGO TECHNOLOGIES INTERNATIONAL SALES PTE. LIMITED, Singapore (SG)

(72) Inventors: Christopher A. Del Signore, San Jose, CA (US); Vineet M. Abraham, San Jose, CA (US); Sathish K. Gnanasekaran, San Jose, CA (US); Pranab Patnaik, Sunnyvale, CA (US); Vincent W. Guan, Saratoga, CA (US); Balakumar N. Kaushik, Sunnyvale, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 322 days.

This patent is subject to a terminal disclaimer.

(21) Appl. No.: 14/854,970

(22) Filed: Sep. 15, 2015

(65) Prior Publication Data

US 2016/0006674 A1 Jan. 7, 2016

Related U.S. Application Data

(63) Continuation of application No. 13/284,778, filed on Oct. 28, 2011, now Pat. No. 9,172,556, which is a
(Continued)

(51) Int. Cl.
*H04L 12/947* (2013.01)
*H04L 12/433* (2006.01)

(52) U.S. Cl.
CPC ............ *H04L 49/25* (2013.01); *H04L 12/433* (2013.01)

(58) Field of Classification Search
CPC ... H04L 12/42; H04L 49/357; H04L 67/1097; H04L 49/25; H04L 49/3009; H04L 49/70; H04L 49/356
See application file for complete search history.

(56) References Cited

U.S. PATENT DOCUMENTS

| 6,401,128 B1* | 6/2002 | Stai | H04L 29/12009 709/236 |
| 6,529,963 B1* | 3/2003 | Fredin | H04L 49/357 703/21 |
| 7,154,886 B2* | 12/2006 | Betker | H04L 49/254 370/386 |

(Continued)

*Primary Examiner* — Jung H Park
(74) *Attorney, Agent, or Firm* — Xsensus LLP

(57) ABSTRACT

An interfabric link between two separate Fiber Channel fabrics so that devices in one fabric can communicate with devices in another fabric without requiring the merger of the two fabrics. The interfabric switch performs a conversion or a translation of device addresses in each fabric so that they are accessible to the other fabric. This translation is preferably done using a private to public loop address translation. In a first embodiment the external ports of the interfabric switch are configured as E_ports. A series of internal ports in each interfabric switch are joined together forming a series of virtual or logical switches. The virtual switches are then interconnected using private loops. The use of the private loop is enabled by the presence of translation logic which converts fabric addresses to loop addresses and back so that loop and fabric devices can communicate. Because each port can do this translation and the private loop addressing does not include domain or area information, the change in addresses between the fabrics is simplified. In a second embodiment the external ports are configured as NL_ports and the connections between the virtual switches are E_ports. Thus the private to public and public to private translations are done at the external ports rather than the (Continued)

internal ports as in the prior embodiment. The virtual switches in the interfabric switch match domains with their external counterparts so that the virtual switches effectively form their own fabric, connected to the other fabrics by the private loops.

20 Claims, 13 Drawing Sheets

Related U.S. Application Data continuation of application No. 10/356,392, filed on Jan. 31, 2003, now Pat. No. 8,081,642.

(56) References Cited

U.S. PATENT DOCUMENTS

| | | | | | |
|---|---|---|---|---|---|
| 7,599,360 | B2* | 10/2009 | Edsall | ................. | H04L 12/4641 370/389 |
| 2003/0118047 | A1* | 6/2003 | Collette | .............. | H04L 12/4633 370/464 |
| 2003/0118053 | A1* | 6/2003 | Edsall | ................. | H04L 12/4641 370/474 |
| 2003/0120915 | A1* | 6/2003 | Kleinsteiber | ........... | H04L 49/10 713/153 |
| 2003/0202474 | A1* | 10/2003 | Kreuzenstein | ........ | H04L 45/742 370/235 |
| 2005/0025075 | A1* | 2/2005 | Dutt | .................... | H04L 12/4641 370/299 |
| 2005/0036499 | A1* | 2/2005 | Dutt | ........................ | H04L 45/00 370/401 |

* cited by examiner

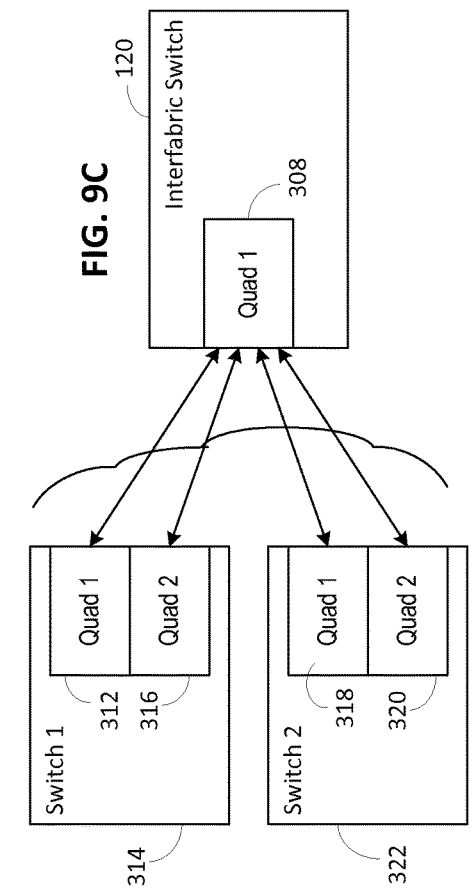
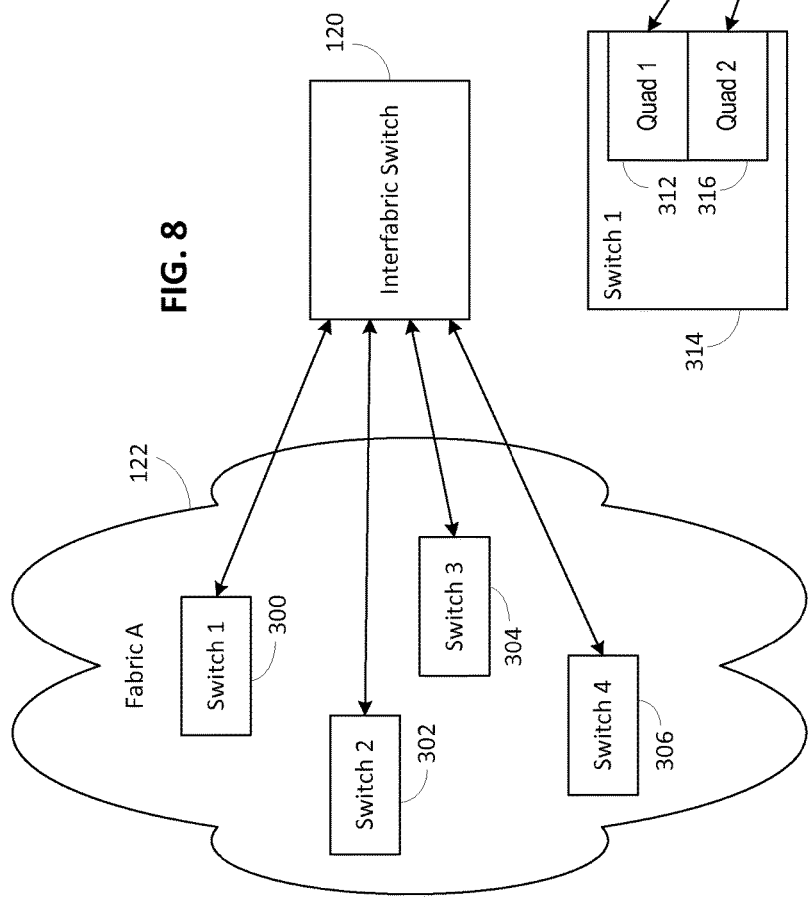

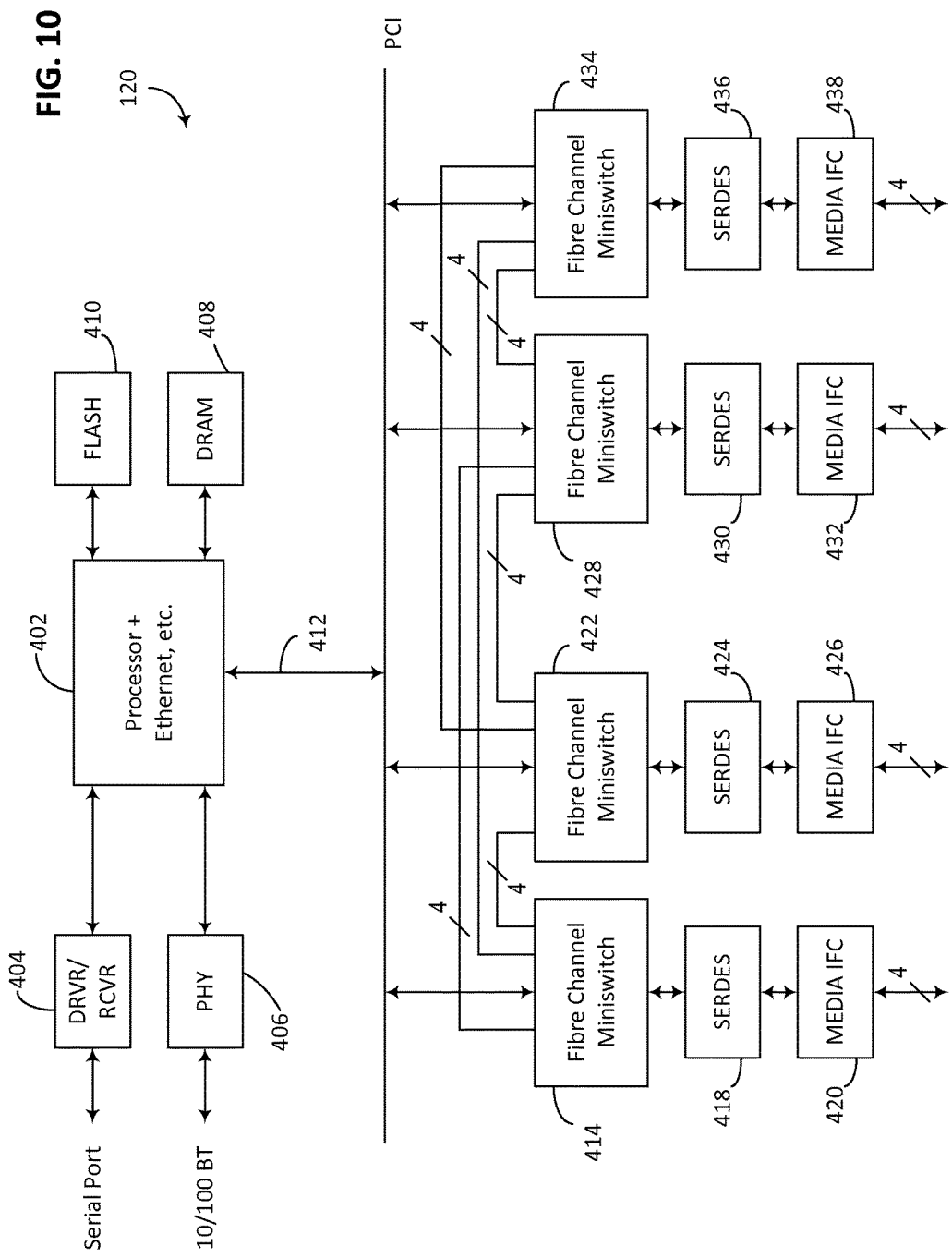

METHOD AND APPARATUS FOR ROUTING BETWEEN FIBRE CHANNEL FABRICS

CROSS REFERENCES TO RELATED APPLICATIONS

This application is a continuation of U.S. application Ser. No. 13/284,778 filed Oct. 28, 2011, entitled "Method and Apparatus for Routing Between Fibre Channel Fabrics," which in turn is a continuation of U.S. application Ser. No. 10/356,392, now U.S. Pat. No. 8,081,642, filed Jan. 31, 2003, entitled "Method and Apparatus for Routing Between Fibre Channel Fabrics," both of which are hereby incorporated by reference as though fully set forth herein.

BACKGROUND OF THE INVENTION

1. Field of the Invention

The invention relates to a method and apparatus for receiving and transmitting data in a network, and more particularly, to a method for receiving and transmitting data between separate Fibre Channel fabrics.

2. Description of the Related Art

As computing power has increased over the years, the need for high performance storage capacity has also increased. To this end, storage area networks (SANs) have been developed. Basically a SAN is an interconnection network between a series of hosts or servers and a series of storage devices. The interconnection network is very high performance to allow each of the servers to access each of the desired storage units without significant performance penalties. The use of SANs allows a more optimal use of the available storage capacity than would otherwise be the case if the storage capacity was directly attached to the particular hosts.

The preferred interconnection network for SANs is Fibre Channel. This is a high speed link system according to a series of ANSI standards. In a Fibre Channel network a series of fabrics or inter-switch connections are developed. Hosts are connected to the fabric, as are the storage units. Then the interconnected switches in the fabric provide a path or route between the host and the storage unit. Thus the development of SANs has allowed very large increases in cost effective storage capacity.

However, there are certain problems when developing networks using Fibre Channel switches. One of the problems is that there can only be 239 distinct domains in a Fibre Channel fabric. Further, there are many conditions under which the fabric will segment or break into two fabrics, so that communication between devices on the two fabrics is not possible. For example, segmentation can be caused when certain parameters associated with the particular switches are not set to the proper values. As the number of switches in the fabric grows larger, the chances of segmentation ever increase. In fact, in many cases it is not possible to maintain all of the desired switches in a single fabric. This then hinders configuration of the particular network because certain devices will not be allowed to access other devices because the two fabrics are not connected. Therefore, it is desirable to have a way to connect the two fabrics so that devices can talk across the two fabrics without requiring that the fabrics be merged or allowing the combination of the two fabrics to have a total of more than 239 domains.

BRIEF SUMMARY OF THE INVENTION

Methods and devices according to the present invention provide an interfabric link between the two separate Fibre Channel fabrics so that devices in one fabric can communicate with devices in another fabric without requiring the merger of the two fabrics. Alternatively, two fabrics with more than a combined total of 239 domains can be created and devices can still communicate. An interfabric switch according to the present invention is connected and linked to each of the two separate fabrics. The interfabric switch then performs a conversion or a translation of device addresses in each fabric so that they are accessible to the other fabric. For example, if a host is connected to fabric A and a storage unit is connected to fabric B, the interfabric switch according to the present invention provides an effective address in fabric A for the storage unit and additionally an effective address for the host unit in fabric B. The interfabric switch then allows a link to be developed between the fabrics and transfers the data packets with the translated addresses over this link. Thus the host and storage unit can communicate as though they were in the same fabric and yet the two particular devices are in separate and distinct fabrics.

This translation is preferably done using public to private and then private to public loop address translations. Using this technique the address translation can be done at full wire speed, after initial setup, so that performance of the network is not hindered by the interfabric switch.

Two particular embodiments of the loop translation are illustrated. In a first embodiment the external ports of the interfabric switch are configured as E_ports. A series of internal ports in each interfabric switch are joined together, with the interfabric switch then having a series of virtual or logical switches. In the preferred embodiment connections from each of the two particular fabrics are provided to a different virtual switch. The internal ports forming the virtual switches are then interconnected using private loops. The use of the private loop in the internal connection is enabled by the presence of translation logic which converts fabric addresses to loop addresses and back so that loop and fabric devices can communicate. Because each port can do this translation and the private loop addressing does not include domain or area information, the change in addresses between the fabrics is simplified.

In a second embodiment the external ports are configured as NL_ports and the connections between the virtual switches are E_ports. Thus the private to public and public to private translations are done at the external ports rather than the internal ports as in the prior embodiment. The virtual switches in the interfabric switch match domains with their external counterparts so that the virtual switches effectively form their own fabric, connected to the other fabrics by the private loops.

BRIEF DESCRIPTION OF THE DRAWINGS

FIG. 8 is a diagram indicating one possible connection of four switches in a fabric to an interfabric switch according to the present invention.

FIGS. 9A, 9B, 9C and 9D are various drawings indicating the interconnection of an interfabric switch according to the present invention with various relations of switches in a fabric.

FIG. 10 is a block diagram of an interfabric switch according to the present invention.

DETAILED DESCRIPTION OF THE PREFERRED EMBODIMENT

Figure 1B:
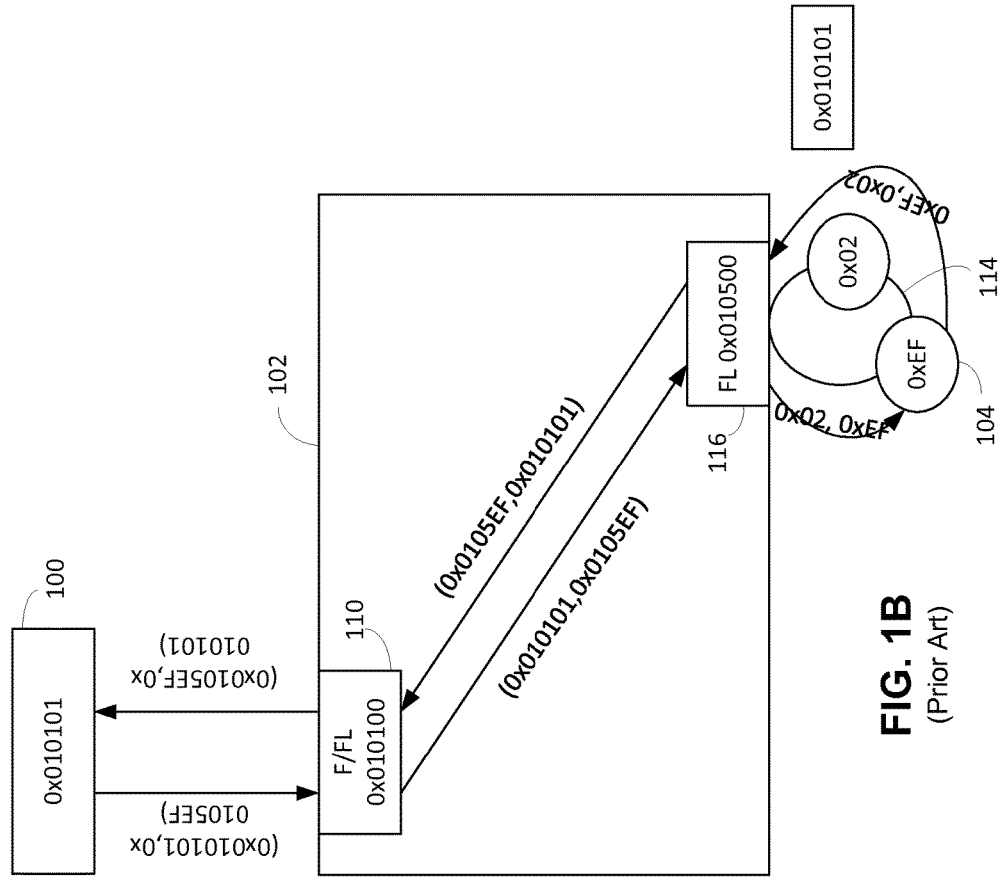
FIG. 1B is a diagrammatic form of the system of FIG. 1A, indicating the particular device addresses to further illustrate the translation.
Figure 1A:
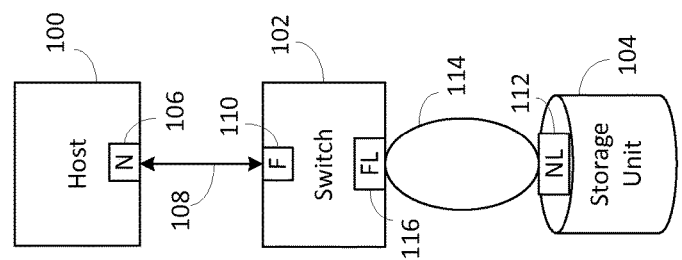
FIG. 1A is a simplified drawing to illustrate private to public mode address translation.

FIG. 1A illustrates a host device 100 connected to a switch 102, which is in turn connected to a storage unit 104. The host 100 includes an N_port 106 which is connected over a Fibre Channel link 108 to an F_port 110 in the switch 102. The storage unit 104 includes an NL_port 112 which is connected by a loop 114 to an FL_port 116 in the switch 102. Assuming that the loop 114 is a private loop so that the storage unit 104 cannot directly communicate with the host 100, the switch 102 would include an apparatus for translating between the public and private devices in the host 100 and storage unit 104. One preferred method for doing this is shown in U.S. Pat. No. 6,401,128 entitled "System and Method for Sending and Receiving Frames Between a Public Device and a Private Device," which is hereby incorporated by reference.

According to the patent, the switch 102 includes various tables to do public to private and private to public address conversions. The switch 102 develops a phantom loop private address for the public device and a phantom public address for the private device and maps the addresses between the public and private spaces. This is shown in more detail in FIG. 1B and in the patent. For example, in FIG. 1B the switch 102 has a domain of 01. Assuming that port 110 is port 1 of the switch 102, the address of port 110 is 010100 in the Fibre Channel addressing technique. Then the host 100 address is 010101. Similarly, port 116 is configured as an FL_port. Assuming that port 116 is the port five of the switch 102, then its address is 010500. The storage unit 104 has an address on the loop 114 connected to the port 116 and for purposes of this explanation it is considered to have an address EF. To allow this private device storage unit 104 to be visible by the host 100 the port 116 then develops a public address for the storage unit 104 of 0105EF. Thus the host 100 can address the storage unit 104 by using this as a destination address.

It is also required that the host 100 appears as an addressable device to the storage unit 104 on the private loop 114. This is done by having the port 116 pick an open loop port address, in this example 02, and assign that to a phantom device representing the host 100. Thus the storage unit 104 would address the phantom unit of the host 100 by using an address of 02 on the loop 114. The FL_port 116 would intercept this communication addressed to an address of 02 and convert that address to 010101 indicating the full fabric address of the host 100. This address and the similarly converted storage unit 104 address of 0105EF would be substituted in the particular packet and then the packet would be provided to the port 110 for transmission to the host 100. Then when a communication is received from the host 100 at port 116, the address 0105EF is translated to the loop address EF and the address 010101 is translated to loop address 02, so that the storage unit 104 can properly receive the frame.

Figure 2:
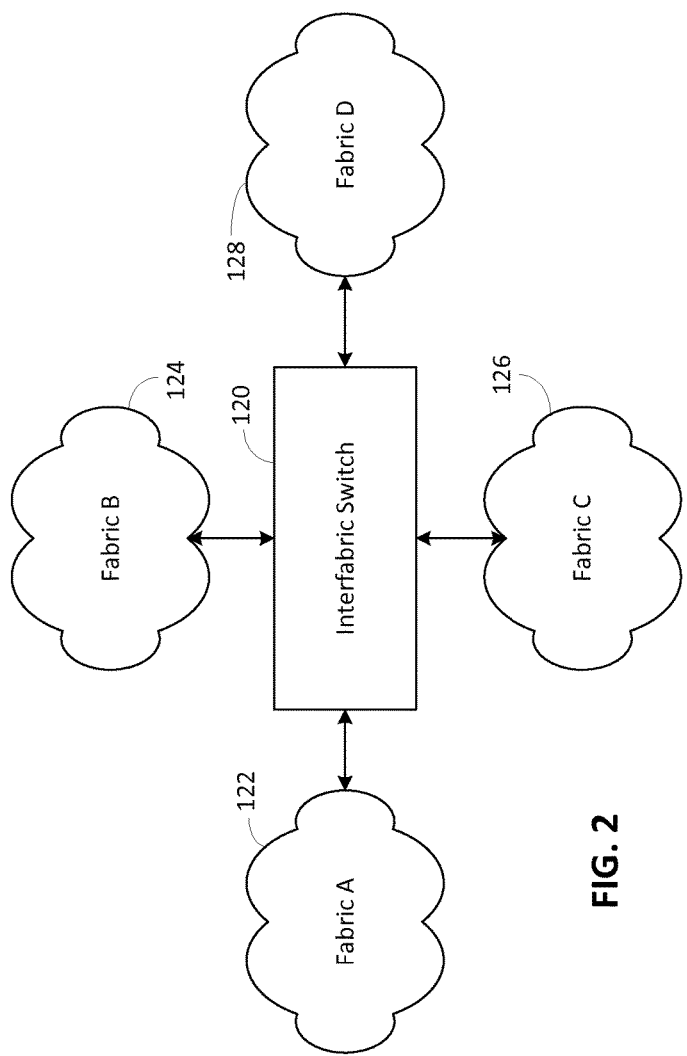
FIG. 2 is a drawing of a network with an interfabric switch according to the present invention interconnecting four separate fabrics.
Figure 3:
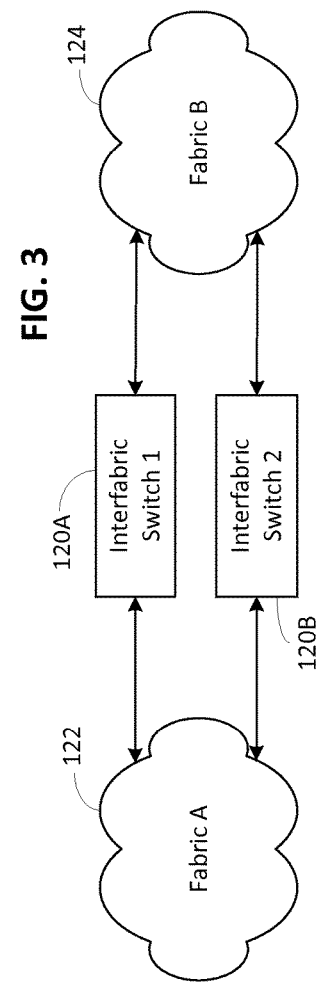
FIG. 3 indicates the use of two interfabric switches according to the present invention between two independent fabrics.

FIG. 2 illustrates an interfabric switch 120 according to the present invention, interconnected between four independent fabrics 122, 124, 126 and 128. Preferably the fabrics 122-128 are either fabrics that are natively understood by the interfabric switch 120 or are operating in an interoperability mode. An alternative embodiment is shown in FIG. 3 where interfabric switches 120A and 120B are connected between fabrics 122 and 124. In the preferred embodiment the switches 120A and 120B are not operating in a redundant mode to simplify programming of the switches 120A and 120B. In an alternative embodiment they could be operating in a redundant manner, with a link between the switches 120A and 120B to allow coordinating communications.

Figure 4:
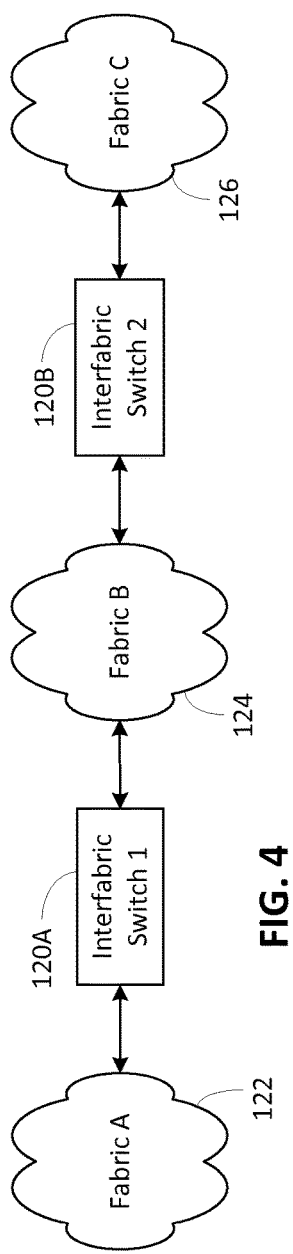
FIG. 4 illustrates the use of two interfabric switches according to the present invention to connect three fabrics.

FIG. 4 illustrates an additional embodiment with an interfabric switch 120A interconnected between fabric 122 and fabric 124 and an interfabric switch 120B interconnected between fabric 124 and fabric 126. In the preferred embodiment devices in fabric C are not presented to interfabric switch 120A but instead are presented only to devices in fabric 124 to simplify programming. However, in an alternative embodiment such extended operation can be included.

Figure 5:
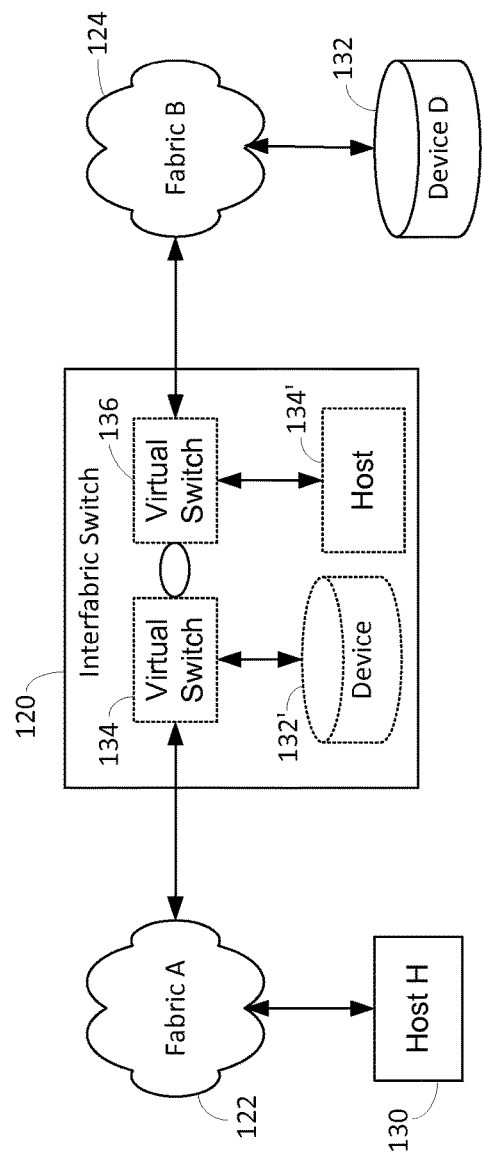
FIG. 5 is a drawing illustrating the virtual devices present in an interfabric switch according to the present invention when connecting two independent fabrics.

FIG. 5 is a simple illustration of operation according to the present invention. Here again, the interfabric switch 120 is connected to fabrics 122 and 124. A host 130 is connected to fabric 122, while a storage device 132 is connected to fabric 124. In operation the interfabric switch 120 presents a virtual switch 134 to the fabric 122 with a virtual storage device 132' connected to the virtual switch 134. Thus the host 130 believes it is addressing the virtual storage device 132'. Similarly, the interfabric switch 120 provides a virtual switch 136 to the fabric 124, with a host 130' connected to the virtual switch 136. The storage device 132 thus communicates with the virtual host 130'. The interfabric switch 120 provides a translation between the two virtual switches 134 and 136 so that communications actually go from host 130 to device 132.

Figure 6:
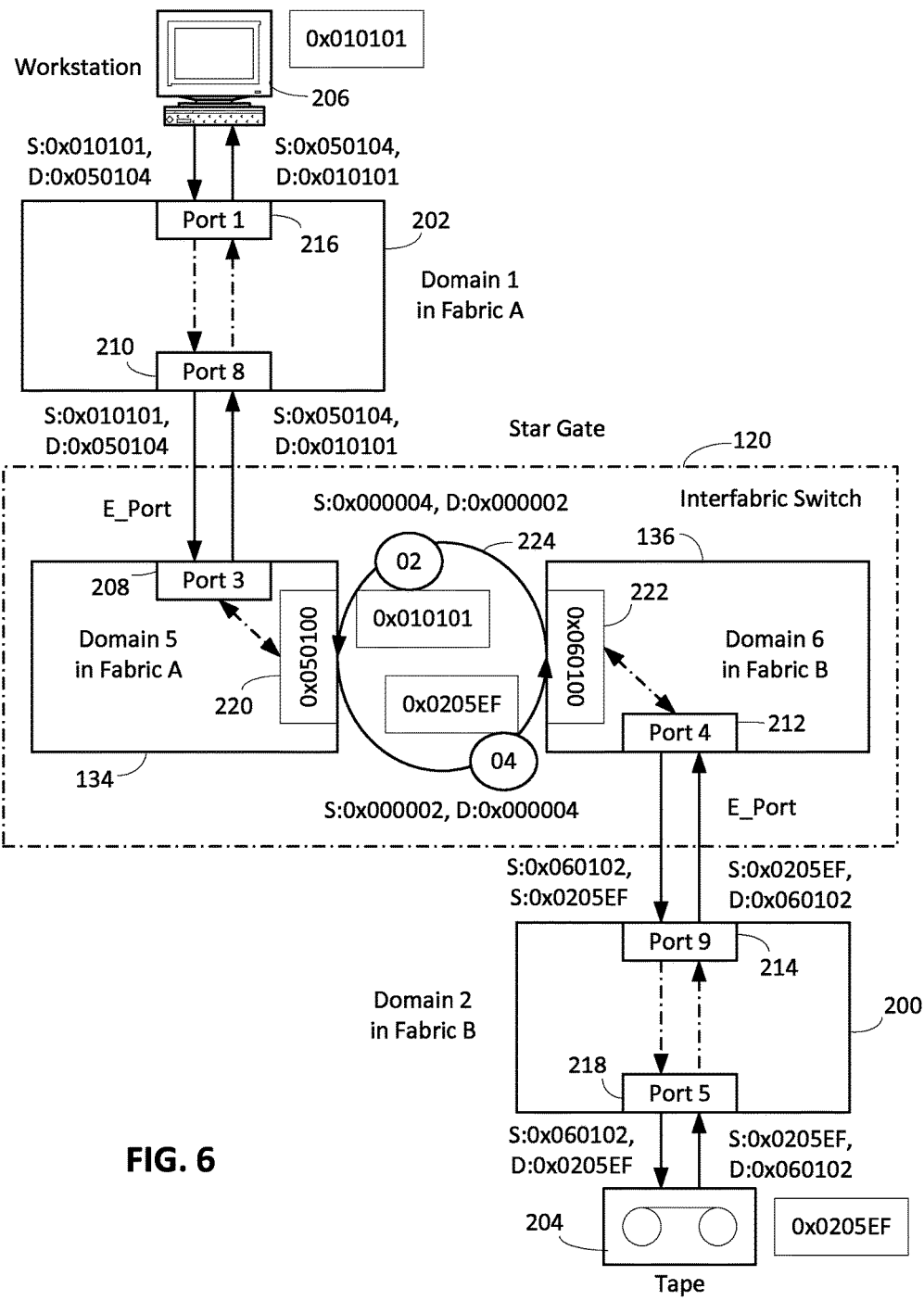
FIG. 6 is a diagram indicating the various devices, switches and interfabric switch, including device addresses, according to the present invention to allow ease of explanation.

A detailed addressing example is shown in FIG. 6. The interfabric switch 120 is connected to a switch 200, which is representative of the fabric 124, and to a switch 202, which is representative of the fabric 122. In the illustrated example, port 3 208 of the interfabric switch 120 is connected to port 8 210 of the switch 202, with both of the ports being configured in E_port mode so that the link is an interswitch link. Similarly, port 4 212 of the interfabric switch 120 is connected to a port 9 214 of switch 200, with both of the ports being configured in an E_port mode. The workstation 206 is connected to the switch 202, and is illustrated connecting to port 1 216. A tape drive unit 204 is connected to port 5 218 of switch 200. It is presumed that the switch 200 is domain 1 in fabric 122 and switch 200 is domain 2 in fabric 124.

The interfabric switch 120, as before, includes virtual switches 134 and 136. In the illustrated embodiment, the virtual switch 134 is assigned domain 5 in fabric 122, while virtual switch 136 becomes domain 6 in fabric 124. Virtual switches 134 and 136 are connected by ports 220 and 222, respectively, which are configured as private loop ports so that a loop 224 results. As described above, then the workstation 206 and the tape unit 204 must have phantom addresses on the private loop 224. In the illustrated embodiment, the address 04 is provided to the tape unit 204 and the address 02 is provided for the workstation 206.

Thus the workstation 206 will address the tape drive 204 by providing a destination address of 050104 that is a full public loop address. The domain 05 indicates the virtual switch 134, the port 01 indicating the virtual port in the virtual switch 134 which in actuality is physical port 3 208. The 04 is the phantom public address of the tape 204 as provided by the private loop translation. This address of 050104 is converted by the virtual loop port 220 to a loop address of 04. This loop address of 04 in turn is translated by virtual loop port 222 to an address of 0205EF, which is the actual address of the tape unit 204 in fabric 124. This address is developed because the tape 204 is connected to port 5 218 of the switch 200, which is domain 2, and the tape unit 204 is preferably a public loop device with an actual loop address of EF. This results in an address of 0205EF for the tape unit 204. For the tape unit 204 to address the workstation 206, an address of 060102 is used. This is developed because the virtual switch 136 is in domain 6 and physical port 4 212 is virtual port 1 indicating that it is 060100 in fabric B. Then as the loop address of the workstation 206 on the virtual private loop 224 is 02, this fully presents itself to the tape unit 204 as a public address of 060102. This address of 060102 is converted by the virtual loop port 222 into a loop address of 02. Packets transmit from the virtual loop port 222 to the virtual loop port 220 are then converted from this loop address of 02 to the desired address of 010101 for the workstation. Similar flow occurs for packets from the workstation 206 to the tape unit 204.

Figure 7:
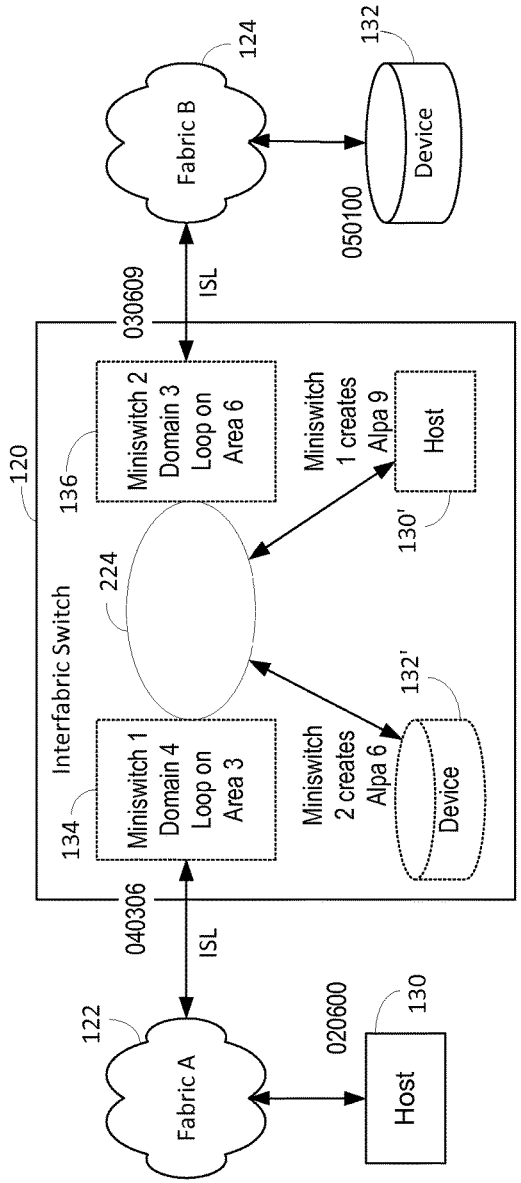
FIG. 7 is an alternative view showing a simplified version of the address translations.

An alternative version of this illustration of this is shown in FIG. 7. The interfabric switch 120 is connected to fabric 122 and fabric 124. A host 130 is connected to the fabric 122 and a storage device 132 is connected to fabric 124. The interfabric switch 120 includes a virtual switch 134 and a virtual switch 136 connected by a private loop 224. The virtual switch 134 is assumed to receive a domain 4 and an area or port address of 3 for the loop. The virtual switch 134 provides a phantom host 130', with a loop address of 9 while the virtual switch 136 provides a virtual storage device 132' with a loop address of 6. The virtual switch 136 is domain 3 and the loop is area or port 6. The host 130 has an address of 020600 by being on domain 2 port 6 and it would address the device 132 by using an address of 040306 to indicate domain 4, port 3 and loop device 6. The device 132 is in domain 5 and port 1 so that it has an address of 050100. Thus the virtual host 130' has an address of 030609 and this is used for addressing purposes by the device 132. The virtual switch 136 converts the 030609 address into a loop address 9 on the loop 224, which virtual switch 134 then translates to 020600 indicating the host 130.

The drawings and explanations of FIGS. 6 and 7 have used a private loop as the means for connecting the virtual switches. This was done to simplify visualization. In fact, any link between the virtual switches which causes the same address translations, such as from 24 bit to 8 bit to 24 bit, can be used. In the preferred embodiment, the links are effectively normal ISLs as between E_ports, except that only private or 8 bit addressing is used on the links, with appropriate 24 bit or public address conversions at each port. Referring to U.S. Pat. No. 6,401,128, this can be done by properly programming the mapping tables and having them active in this essentially private E_port mode. The public to private translation will remove the domain and area bits, which will be provided by the private to public translation in the manner described above. This is preferred because it allows the ports to be trunked to increase through put between the virtual switches. However, if the specific components used do not provide this capability, then private loops can be used as illustrated.

FIG. 8 is the first of several illustrations of the connections of the interfabric switch 120 to particular switches inside the fabric 122. In FIG. 8 the interfabric switch 120 is connected to four individual switches 300, 302, 304, and 306 inside the fabric 122. The interfabric switch 120 is thus allowed to connect to the devices, which are routed through these four switches 300-306.

Figure 9A:
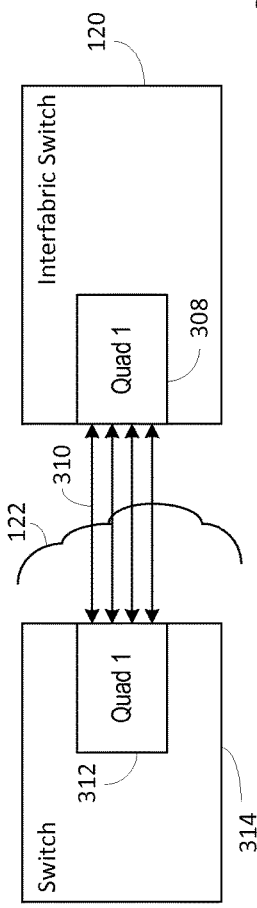
Figure 9B:
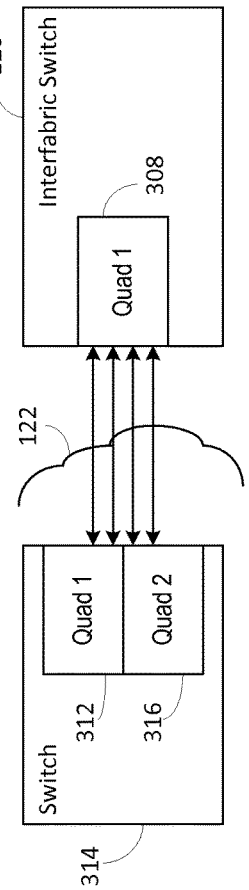
Figure 9D:
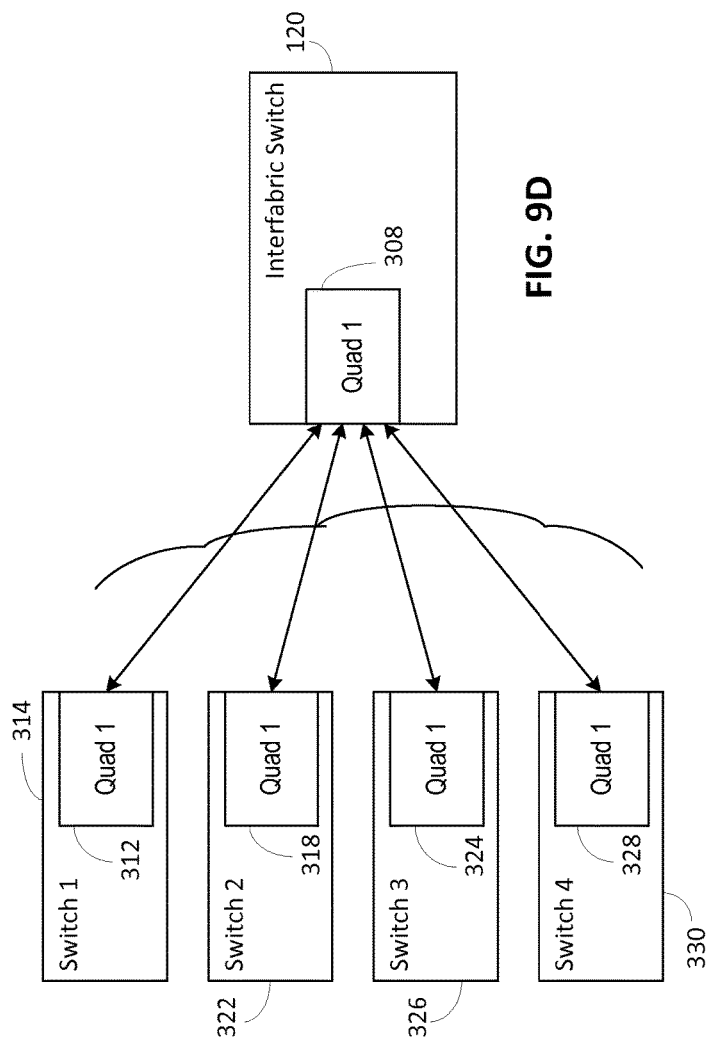

FIGS. 9A, 9B, 9C, and 9D illustrate more detailed connections of the interfabric switch 120. Each of the switches in the preferred embodiment have their ports organized into quads, with the ports in the particular quads capable of being trunked as described in U.S. patent application Ser. No. 09/872,412, entitled "Link Trunking and Measuring Link Latency in Fibre Channel Fabric" by David C. Banks, Kreg A. Martin, Shunjia Yu, Jieming Zhu and Kevan K. Kwong, filed Jun. 1, 2001, which is hereby incorporated by reference. Thus interfabric switch 120 in FIG. 9A includes a quad 308 which is connected by four trunked links 310 to a quad 312 in a switch 314 in fabric 122. In the alternate embodiment shown in FIG. 9B, the interfabric switch 120 has its quad 308 connected to quads 312 and 316 in switch 314. In this case, the two links between quad 308 and quad 312 are trunked and the two links between quad 308 and 316 are trunked. In FIG. 9C, the interfabric switch 120 has its quad 308 connected to quads 312 and 316 in switch 314 and to quads 318 and 320 in switch 322. In this embodiment, none of the links can be trunked because they are in different quads. FIG. 9D then shows a more detailed breakdown of FIG. 8 where quad 308 of interfabric switch 120 is connected to quad 312 in switch 314, to quad 318 in switch 322, to quad 324 in switch 326 and to quad 328 in switch 330. Accordingly, because these are going to four separate switches none of the links can be trunked.

FIG. 10 illustrates a block diagram of an interfabric switch 120 according to the preferred embodiment. In switch 120 a processor unit 402 which includes a high performance CPU, preferably a PowerPC, and various other peripheral devices including an Ethernet module, is present. Receiver/driver circuitry 440 for a serial port is connected to the processor unit 402, as is a PHY 406 used for an Ethernet connection. A flash memory 410 is connected to the processor 402 to provide permanent memory for the operating system and other routines of the interfabric switch 120, with DRAM 408 also connected to the processor 402 to provide the main memory utilized in the interfabric switch 120. A PCI bus 412 is provided by the processor 402 and to it are connected a series of Fabric Channel miniswitches 414, 422, 428 and 434. The Fibre Channel miniswitches 414, 422, 428 and 434 are preferably developed as shown in U.S. patent application Ser. No. 10/123,996, entitled, "Fibre Channel Zoning By Device Name In Hardware," by, Ding-Long Wu, David C. Banks, and Jieming Zhu, filed on Apr. 17, 2002 which is hereby incorporated by reference. Each of the miniswitches 414, 422, 428, and 434 are thus effectively 16 port switches, with each miniswitch further broken down into four quads, as previously referenced. Four of the ports of each of the miniswitches 414, 422, 428, and 434 are connected to a series of serializers 418, 424, 430, and 436, which are then connected to media units 420, 426, 434, and 438 to present external ports for the interfabric switch 120.

To provide the necessary interconnections to represent the virtual switches in the interfabric switch 120, the miniswitches 414, 422, 428, and 434 are interconnected. Thus, four ports on miniswitch 414 are connected to four ports on miniswitch 422, four ports on miniswitch 414 are connected to four ports on miniswitch 434 and four ports on miniswitch 414 are connected to four ports on miniswitch 428. Similarly, four ports on miniswitch 422 are connected to four ports on miniswitch 428 and four ports on miniswitch 422 are connected to four ports on miniswitch 434. Finally, four ports on miniswitch 428 are connected to four ports on miniswitch 434. Thus, this provides a full direct interconnect between any of the four miniswitches 414, 422, 428, and 434. The various ports connected between the various miniswitches are configured to be private loop ports so that the miniswitches 414, 422, 428, and 434 provide the private to public translations as previously described. The external ports for the interfabric switch 120 are configured as E_ports in the miniswitches 414, 422, 428, and 434. It is also noted that each of the groups of four is preferably obtained from a quad in each of the miniswitches.

Figure 11:
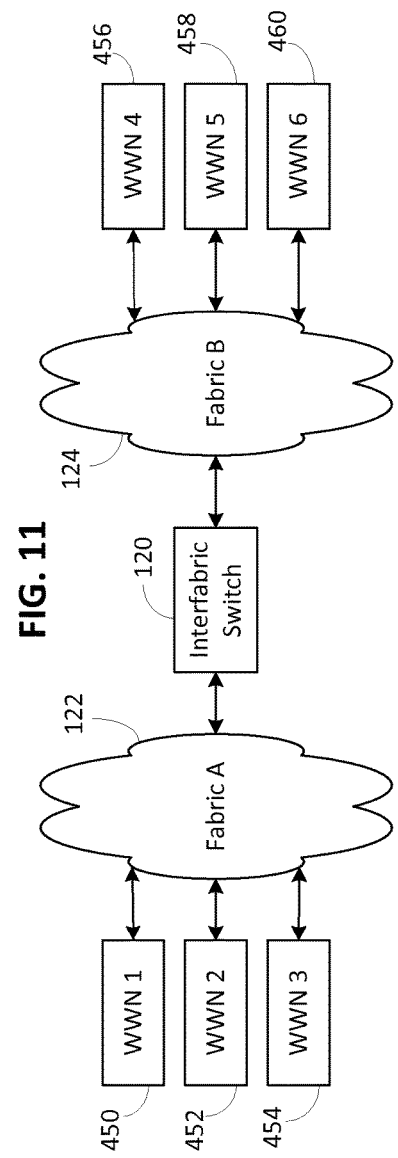
FIG. 11 is a drawing indicating the use of World Wide Names of various devices connected to fabrics which are connected by an interfabric switch according to the present invention.

Referring to FIG. 11, this is an alternative view of the network as shown from the perspective of the configuration manager. In this view point an interfabric switch 120 is connected to fabrics 122 and 124. Three devices 450, 452 and 454, each having unique worldwide names (WWNs), are connected to fabric 122, while devices 456, 458, and 460, each also having unique worldwide names, are connected to fabric 124. This is the perspective utilized by management software to configure the mapping in the interfabric switch 120 to allow the proper address translations to occur and to provide easiest interface to system administrators. Using management software the administrator of each fabric 122 and 124 will provide the interfabric switch 120 with a list of WWNs available for export from the fabric and a list of WWNs desired to be imported into the fabric. The interfabric switch 120 then uses these export/import lists to establish the necessary phantom devices on the private loops and the translations done by the virtual switches.

Figure 12:
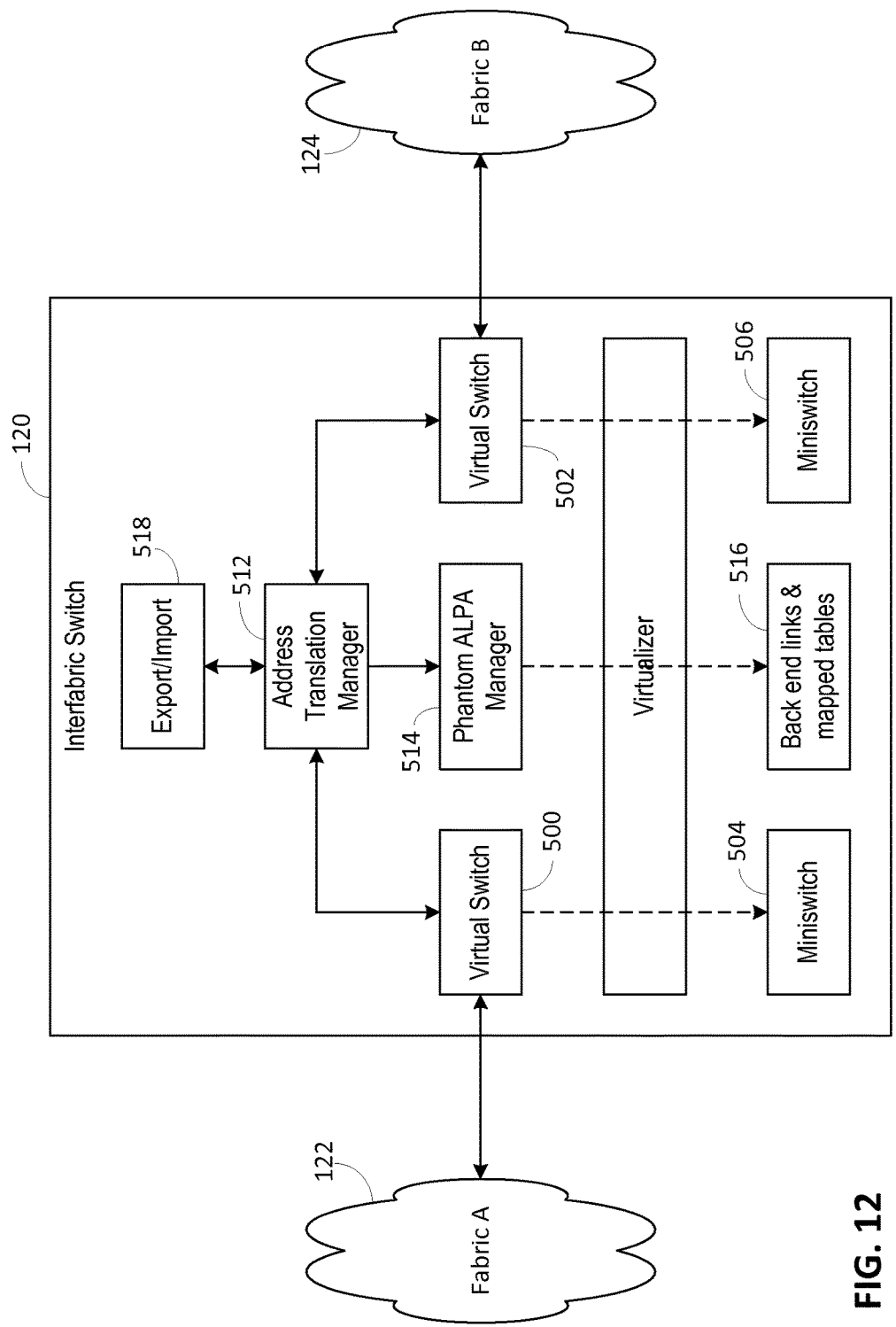
FIG. 12 provides a block diagram of various software modules and related hardware modules in an interfabric switch according to the present invention.

FIG. 12 illustrates an alternative block diagram of the interfabric switch 120, which includes a mixture of software and hardware modules. In the embodiment shown in FIG. 12 only two miniswitches are illustrated for simplicity. The interfabric switch 120 includes virtual switches 500 and 502, which are connected to fabrics 122 and 124, respectively. Virtual switch 500 effectively maps to miniswitch 504, while virtual switch 502 effectively maps to miniswitch 506. An address translation manager 512, which manages the particular address translations performed in the private to public mappings in the interfabric switch 120 is connected to the virtual switches 500 and 502. As the name servers executing on each virtual switch detect changes in connected devices in each fabric, the changes are provided to the address translation manager 512 to allow any needed changes in address translations. The address translation manger 512 is also connected to a phantom ALPA manager 514, which maps into the various tables 516 in the miniswitches 504 and 506 which perform the actual address translations in hardware. The phantom ALPA manager 514 receives the desired translations from the address translation manager 512 and properly sets up the various tables 516. In addition, the phantom ALPA manager 514 also receives any PLOGI events, which are trapped by filters in the system illustrated in Ser. No. 10/123,996. The phantom ALPA manager 514 checks with the address translation manager 512 to see if they are relevant to any devices being imported from the other fabric. If so, appropriate steps are taken and the new device is incorporated. If not, normal PLOGI handling routines are invoked. The address translation manager 512 is connected to an export/import list 518, which is the list of devices to be exported from and imported into each fabric. The address translation manager uses the export/import list in conjunction with information from the name server and the PLOGI trapping by the phantom ALPA manager 514 to determine the actual address translations needed in the interfabric switch 120.

Figure 13:
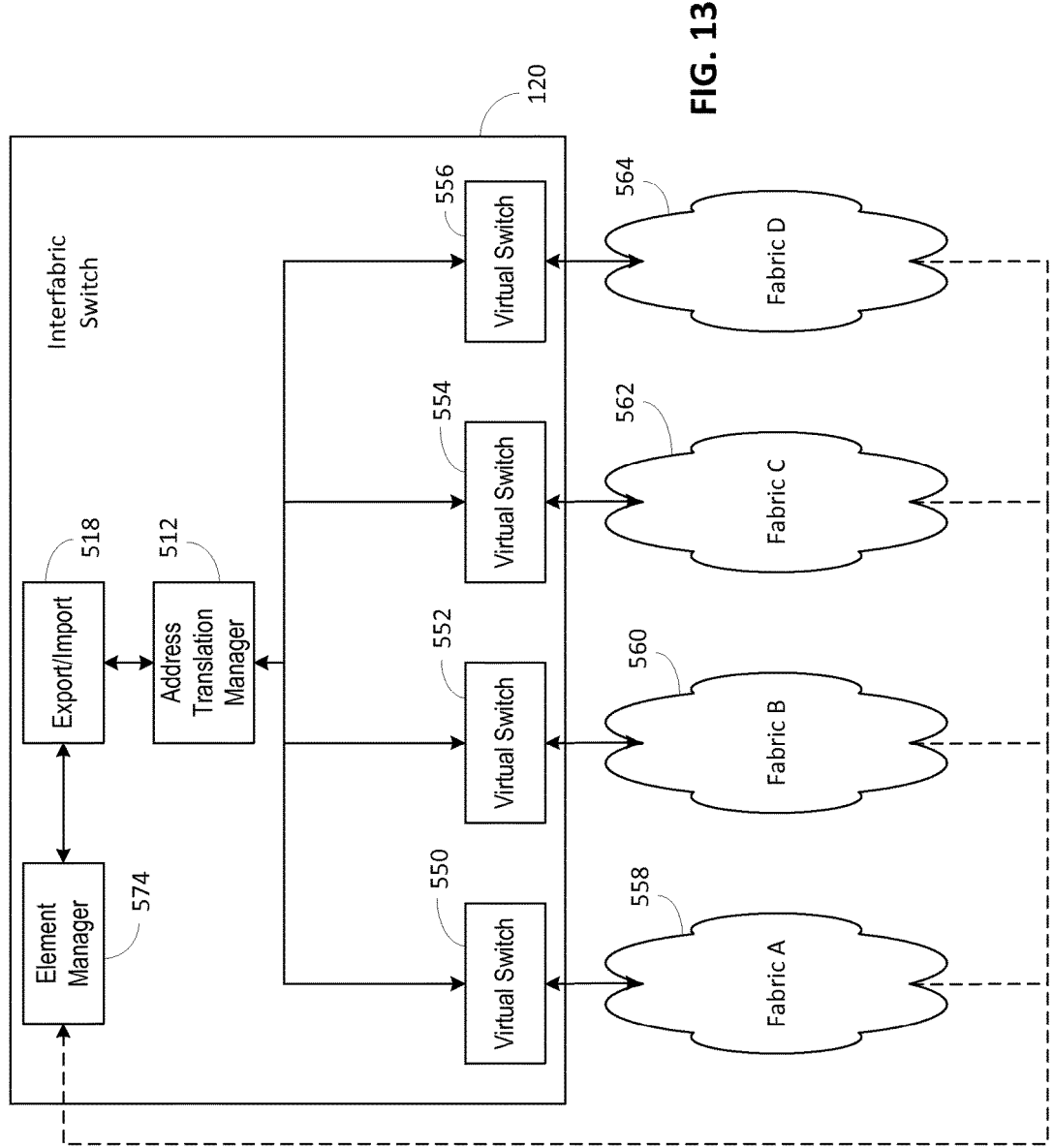
FIG. 13 illustrates an alternative software module breakdown of an interfabric switch according to the present invention.

A slightly different view is shown in FIG. 13, where the interfabric switch 120 is shown with four virtual switches 550, 552, 554, and 556, which connect to respectively fabrics 558, 560, 562, and 564. Each of the virtual switches 550, 552, 554, and 556, are connected to the address translation manager module 512, which is connected to the export/import list 518, which in turn, is connected to an element manager 574. The element manager 574 provides a portion of the management interface in the interfabric switch 120 and is used to load or change the export/import database 518. The dotted lines from the various fabrics 558, 560, 562, and 564 indicate read only access to the element manager 574 for the various devices in the fabrics for identification purposes.

Figure 14:
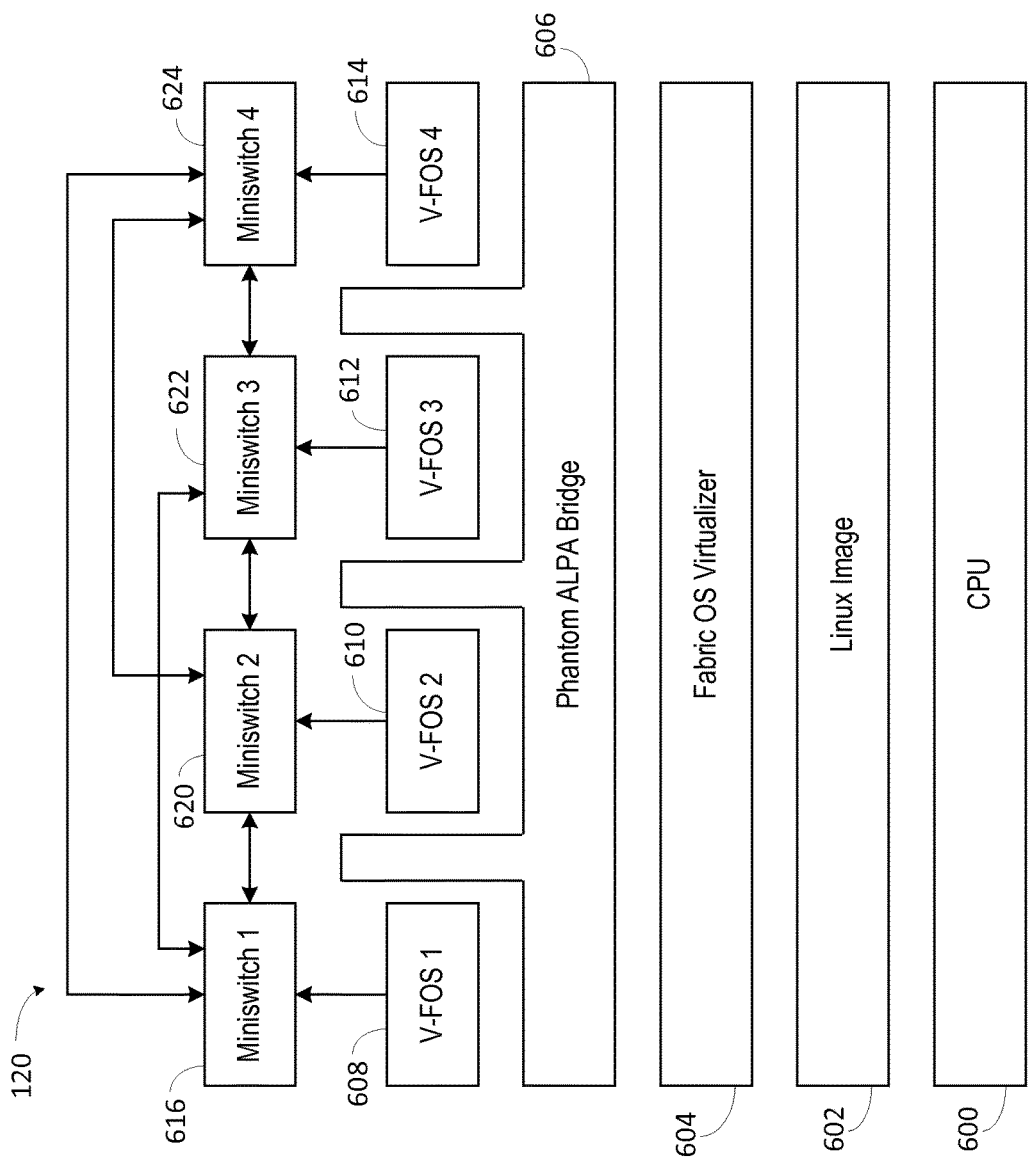
FIG. 14 illustrates various software layers present in an interfabric switch according to the present invention.

FIG. 14 illustrates a software layer view of the interfabric switch 120. A CPU 600 is at the lowest layer with an operating system image 602, preferably the Linux operating system in the preferred embodiment, executing on the CPU. A fabric operating system virtualizer module 604 is operating in the operating system image 602. The virtualizer module 504 will make necessary changes to the miniswitch drivers to allow the miniswitches to be partitioned and to other Linux components necessary to allow multiple fabric operating system instances. After the virtualizer module 504 loads and executes, four instantiations of the virtual fabric operating system (V-FOS) 608, 610, 612, and 614 are loaded. One instantiation is assigned to each miniswitch in the preferred embodiment. The virtual fabric operating system is a slightly modified copy of the fabric operating system used in a conventional switch. After the four V-FOSs 508, 610, 612, and 614 are executing, a phantom APLA bridge 606 that operates on top of the fabric OS virtualizer 604 and below the V-FOSs 608, 610, 612, and 614 is loaded and executed. The V-FOS 608, 610, 612, and 614 instructions configure the internally connected miniswitch ports as private link ports, either FL_ports for a private loop or private E_ports for the link described above. The phantom ALPA bridge 606 then programs the miniswitches as necessary to develop the private connections and the necessary translations, as described above. Thus, four virtual switch instantiations are present and separated by the phantom ALPA bridge 606 so that there are in actuality four virtual switches executing on the interfabric switch 120. Each of these virtual fabric operating system instantiations 608, 610, 612 and 614 thus control their respective miniswitches 616, 620, 622, and 624 and perform normal switch functions, such as name server functions, except that in the preferred embodiment the virtual switches cannot act as the principal switch in a fabric.

To coordinate with FIGS. 12 and 13, the address translation manager 512, export/import list 518 and element manager 574 execute at the level of the fabric operating system virtualizer 604 as switch-level tasks.

Figure 15:
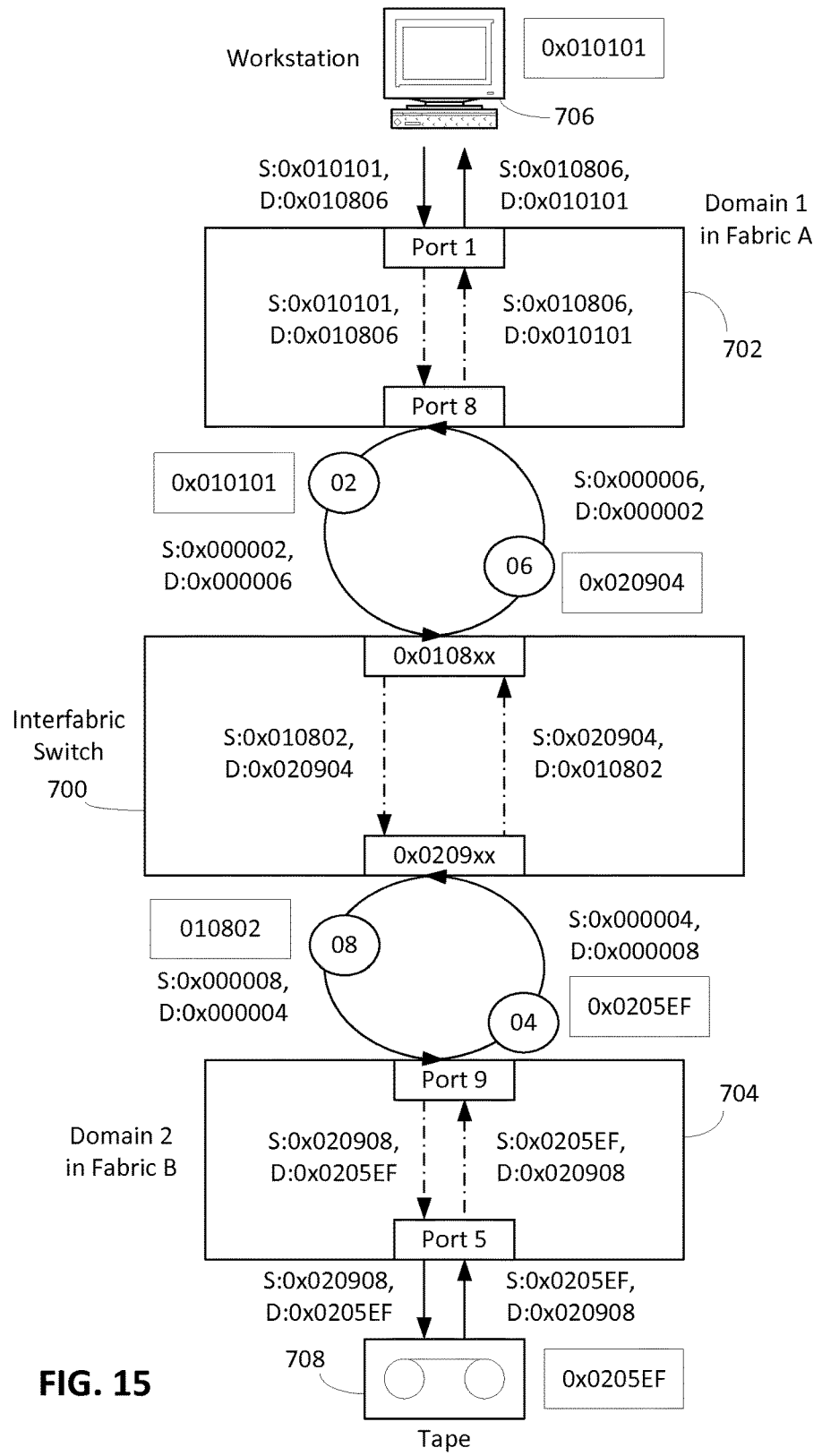
FIG. 15 is a diagram showing address flow and translation for an alternate embodiment when the interfabric switch ports are connected as NL_ports.

In previous embodiments it has been seen that the external ports of the interfabric switch 120 are configured in an E_port mode. In an alternative embodiment as shown in FIG. 15, the external ports of an interfabric switch 700 are configured to be NL_ports. Thus the mating or connected ports on switches 702 and 704 are configured as FL_ports, while the various other ports on the switches 702 and 704 are configured normally. For example, the port of switch 700 is connected to the illustrated workstation 706 and configured in an F_port mode, and the port connected to the tape unit 708 in switch 704 is configured as an FL_port, as the tape unit is connected in loop mode.

The NL_ports of the interfabric switch 700 are configured as having two addresses, one public and one private. The interfabric switch 700 uses the public address to log into the connected fabric and learn the address of the connected FL_port, which it then configures as its own address. The FL_port will also detect the private address by probing as described in U.S. Pat. No. 6,353,612, which is hereby incorporated by reference. The NL_port will then create a public-private translation for the private device. The FL_port will also develop a phantom address in the connected device, which the interfabric switch 700 will determine. This is done for each fabric, so the interfabric switch 700 ends up knowing all the device public-private address translations and has addresses for the connected ports in different domains.

The interfabric switch 700 then assigns public addresses for each of the phantom devices connected to each port based on the port address. The interfabric switch 700 then effectively separates the ports into virtual switches as described above, with the domain of each virtual switch defined by the public port address. The virtual switches thus effectively form their own fabric separated from the other fabrics by the loops. The virtual switches are connected by E_ports so no address translations are necessary and the public addresses of the phantom devices are used.

In this mode the public to private translations occur between the interfabric switch 700 and the switches 702 and 704 instead of internal to the interfabric switch 700. The address mappings are shown in detail in FIG. 15 and will not be described in detail but can be readily understood based on prior descriptions and review of the figure.

As previously mentioned with respect to FIGS. 6 and 7, private loops are used to simplify visualization but any link which causes the same public to private to public address translations can be used.

Figure 16:
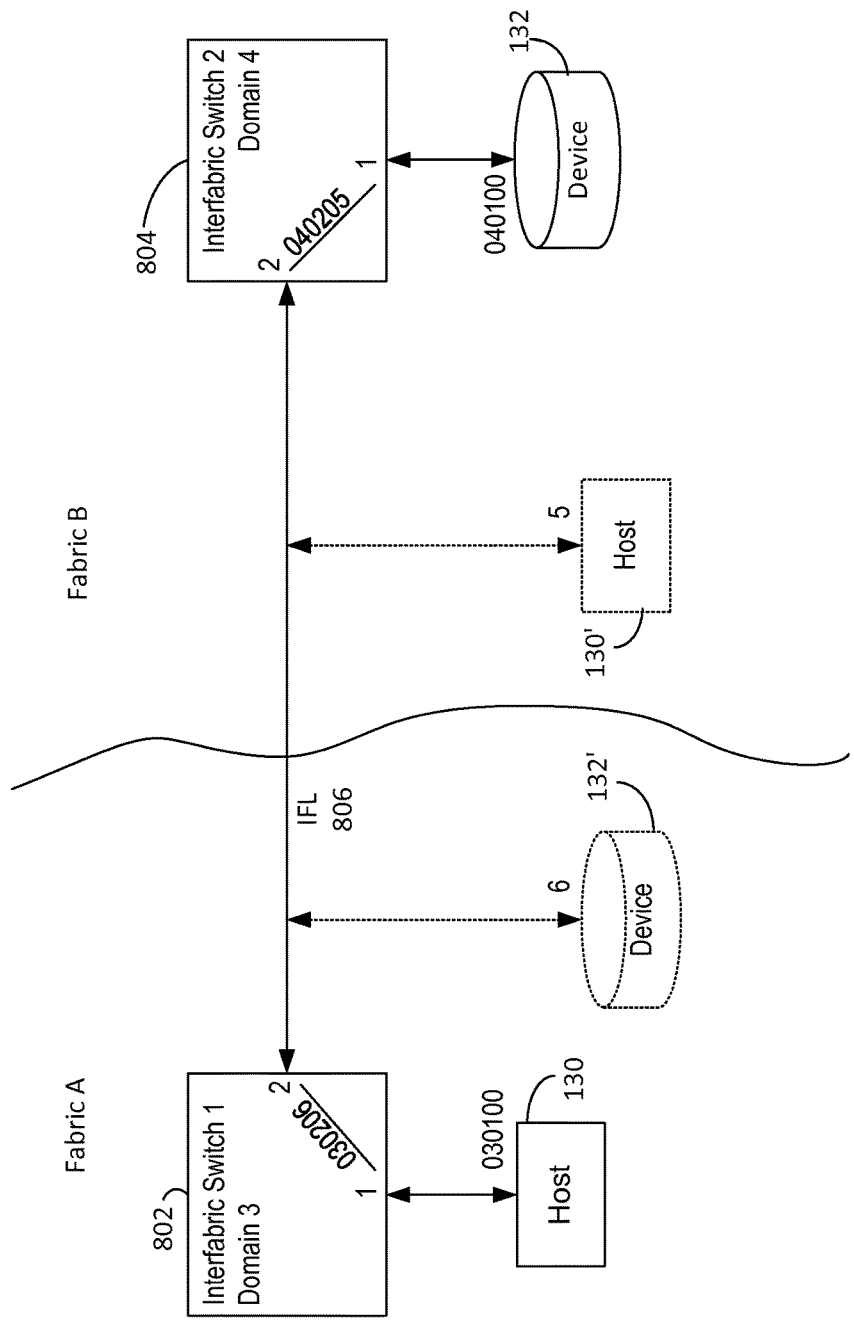
FIG. 16 is a diagram showing switch connections for an additional alternate embodiment.

In a third variation shown in FIG. 16, two interfabric switches 802 and 804 are in fabric A and fabric B, respectively. They are connected by an interfabric link (IFL) 806. Effectively the IFL 806 is an ISL with only private addressing, as discussed with relation to FIGS. 6, 7, and 15. Each interfabric switch 802 and 804 has a port, port 2 in both illustrated cases, connected to the link. These ports can be referred to as I_ports for simplicity, but these ports operate as E_ports except they perform the public to private and private to public address translations.

A host 130 is shown connected to port 1, an F_port, of interfabric switch 802, which is illustrated as being domain 3. A storage device 132 is similarly connected to port 1, an F_port, of interfabric switch 804, which is illustrated as being domain 4. Thus, the address of the host 130 is 030100 and of the storage device 132 is 040100. The interfabric switch 804 presents the storage device 132 as a phantom storage device 132' with a private address of 6. The interfabric switch 802 presents the host 130 as a phantom host 130' with a private address of 5. The interfabric switch 804 translates this private address 5 to a public address of 040205, indicating connection to domain 4, port 2, device 5. Similarly, the interfabric switch 802 translates the private address 6 as 030206 indicating domain 3, port 2, device 6. Thus addressing by the various devices occurs as in the prior examples.

The I_ports must be defined as such at switch setup or initialization for proper operation. Further, messaging must occur between each of the interfabric switches 802 and 804 to confirm that they are connected through I_ports by an IFL. Additionally, each I_port will have to keep track of all allocated private addresses to prevent duplication. Ports not defined as I_ports would be initialized according to normal protocols. The interfabric switches 802 and 804 would then operate as normal switches, routing frames between ports as usual.

In this embodiment a V_FOS is not required as there are no virtual switches, but the export/import list 518, address translation manager 512 and phantom ALPA manager 514 are still needed. This embodiment does have the possible disadvantage that it may be less clear for an administrator to use as it will be more difficult to determine which ports are the I_ports, while in the prior embodiments all the ports will perform the necessary functions.

In all of the above examples of interfabric switches, most interfabric events must be suppressed so that they do not cross between the fabrics. Basically, the only messages that are passed are RSCNs for devices which are imported into the other fabric as the devices come on line or go offline in their original fabric and various SW_ILS frames as the switches initiate operations.

Additionally, certain frames must be captured for operation by the processor on each switch. One example is a PLOGI frame so that the import and export tables can be checked and the SID or DID in the header changed if necessary. A second example are various SW_ILS frames which include SID and DID values in their payload so that the payload values can be changed. This trapping is done in normal manner, such as hardware trapping as described in Ser. No. 10/123,996.

While illustrative embodiments of the invention have been illustrated and described, it will be appreciated that various changes can be made therein without departing from the spirit and scope of the invention.

The invention claimed is:

1. A Fibre Channel interfabric device, comprising:
   a first Fibre Channel port connected to a first Fibre Channel fabric;
   a second Fibre Channel port connected to a second Fibre Channel fabric; and
   processing circuitry configured to transfer Fibre Channel packets, that were transmitted through the first Fibre Channel fabric from a first device and received at the first Fibre Channel port, from the second Fibre Channel port through the second Fibre Channel fabric and to a second device, with all switching being done using a first Fibre Channel address local to and unique in the first Fibre Channel fabric to represent the second device, and a second Fibre Channel address local to and unique in the second Fibre Channel fabric to represent the first device.

2. The Fibre Channel interfabric device of claim 1, wherein the processing circuitry is configured to perform public to private address translations and to perform private to public address translations.

3. The Fibre Channel interfabric device of claim 1, wherein the processing circuitry is connected to the first Fiber Channel port and to the second Fibre Channel port.

4. The Fibre Channel interfabric device of claim 1, further comprising:
a first Fibre Channel switch connected to the first Fibre Channel port; and
a second Fibre Channel switch connected to the second Fibre Channel port, wherein
the processing circuitry is connected to the first Fibre Channel switch and the second Fibre Channel switch.

5. The Fibre Channel interfabric device of claim 4, wherein the first Fibre Channel switch and the second Fibre Channel switch are connected to each other.

6. The Fibre Channel interfabric device of claim 1, wherein the processing circuitry is configured to translate between a first device address of the first device and the second Fibre Channel address.

7. The Fibre Channel interfabric device of claim 1, wherein the second Fibre Channel address is a virtual address designated to the first device.

8. A method for switching Fibre Channel addresses in a Fibre Channel interfabric device including a first Fibre Channel port connected to a first Fibre Channel fabric, and a second Fibre Channel port connected to a second Fibre Channel fabric, the method comprising:
transferring Fibre Channel packets, that were transmitted through the first Fibre Channel fabric from a first device and received at the first Fibre Channel port, from the second Fibre Channel port through the second Fibre Channel fabric and to a second device, with all switching being done using a first Fibre Channel address local to and unique in the first Fibre Channel fabric to represent the second device, and a second Fibre Channel address local to and unique in the second Fibre Channel fabric to represent the first device.

9. The method of claim 8, further comprising:
performing public to private address translations; and
performing private to public address translations.

10. The method of claim 8, wherein the Fibre Channel interfabric device further includes:
a first Fibre Channel switch connected to the first Fibre Channel port; and
a second Fibre Channel switch connected to the second Fibre Channel port.

11. The method of claim 10, wherein the first Fibre Channel switch and the second Fibre Channel switch are connected to each other.

12. The method claim 8, further comprising translating between a first device address of the first device and the second Fibre Channel address.

13. The method of claim 8, wherein the second Fibre Channel address is a virtual address designated to the first device.

14. An interfabric device connected to a first fabric via a first port and connected to a second fabric via a second port, the interfabric device comprising:
processing circuitry configured to
transfer packets, that were transmitted through the first fabric from a first device and received at the first port, from the second port through the second fabric and to a second device; and
perform switching using a first Fibre Channel address local to and unique in the first fabric to represent the second device, and a second Fibre Channel address local to and unique in the second fabric to represent the first device.

15. The interfabric device of claim 14, wherein the processing circuitry is configured to perform public to private address translations and to perform private to public address translations.

16. The interfabric device of claim 14, wherein the processing circuitry is connected to the first port and to the second Channel port.

17. The interfabric device of claim 14, further comprising:
a first switch connected to the first port; and
a second switch connected to the second port, wherein
the processing circuitry is connected to the first switch and the second switch.

18. The interfabric device of claim 17, wherein the first switch and the second switch are connected to each other.

19. The interfabric device of claim 14, wherein the processing circuitry is configured to translate between a first device address of the first device and the second Fibre Channel address.

20. The interfabric device of claim 14, wherein the second Fibre Channel address is a virtual address designated to the first device.

* * * * *